3,077,948
HUBCAP APPARATUS
Denny B. Law, Granada Hills, Calif.
(26363 Ravenhill Road, Saugus, Calif.)
Filed May 10, 1961, Ser. No. 109,121
11 Claims. (Cl. 184—45)

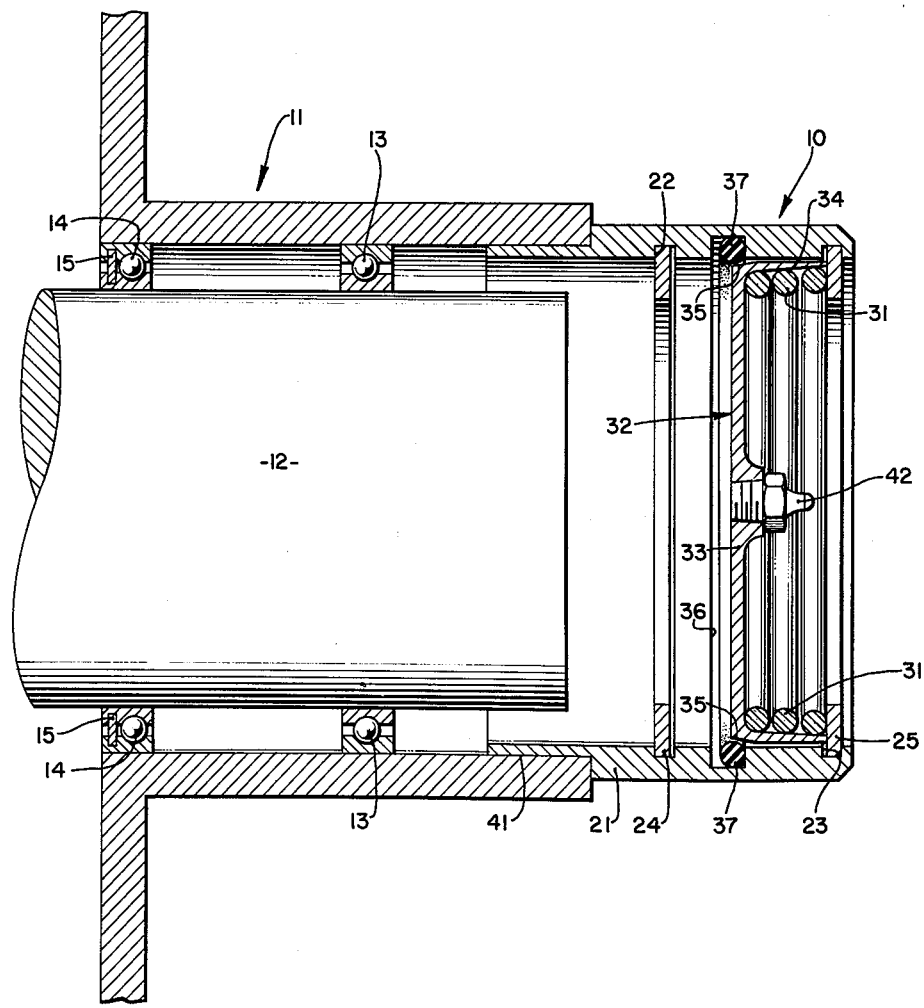

The present invention relates to hubcaps, and more particularly to hubcaps for wheel hubs that are subjected to periodic immersion in water.

Conventional hubcaps are stamped metal caps which are press fitted into the open end of the wheel hub to seal off the wheel bearings. Although conventional hubcaps protect the wheel bearings from contamination under normal conditions, they are not satisfactory when the hub assembly is subjected to immersion in water, as in the case of boat trailers.

Boats are usually transported between the owner's home and the boat launching site by means of boat trailers towed by automobiles. In order to remove the boat from the trailer and get it into the water, it is necessary to back the trailer into the water, so that the boat can be floated off the trailer.

The towing of the boat trailer to the boat launching site causes bearing and grease friction, which generates heat within the wheel hub. The heat causes pressure within the hub to build up, which in turn causes the air within the wheel hub to escape through the rotating seal. Then, at the boat launching site, when the boat trailer is backed into the water to launch the boat, the submerged hub is suddenly cooled by the water. The cooling contracts the air inside the hub and creates a partial vacuum therein, which causes water and silt to seep into the hub. The resulting rust and erosion inevitably causes bearing damage.

It is an object fo the present invention, therefore, to provide a novel hubcap apparatus.

It is another object of the present invention to provide a hubcap apparatus that will not allow water, sand, or other contaminants to enter the hub even when it is submerged while hot.

According to the present invention, a hubcap apparatus comprises a cylindrical barrel member containing a free-floating spring-loaded piston having a grease fitting. The piston initially seals the hub. As the hub is filled with grease, the pressure forces the piston to move, until the hub is no longer sealed. At this point, the excess grease escapes, so that the spring-loaded piston again seals the hub. This latter feature insures the sealing of the hub with a slight positive pressure, while preventing over-pressurization of the hub.

The features of the present invention that are believed to be novel are set forth with particularity in the appended claims. The present invention, both as to its organization and manner of operation, together with further objects and advantages thereof, may best be understood by reference to the following description, taken in connection with the accompanying drawing, in which:

The sole FIGURE is a sectional view of a hubcap apparatus in accordance with the present invention.

Referring now to the drawing, the sole figure shows cylindrical hubcap 10 mounted in wheel hub 11, which is free to rotate about spindle 12 by means of bearings 13 and 14. Rotating seal 15 seals the chamber within hub 14, while allowing rotation between hub 11 and spindle 12.

Steel cylindrical barrel 21 of hubcap 10 contains recesses 22 and 23 for steel retaining rings 24 and 25, respectively. Retaining ring 25 supports coil compression spring 31, which is made of music wire and applies force to aluminum piston 32. Piston 32 has head member 33 and cylindrical wall member 34. Chamfer 35 is formed where head member 33 meets cylindrical wall member 34. Chamfer 35 may, by way of example, be about $\frac{1}{10}$ of an inch wide and have an angle of about 15 degrees from the horizontal. There should preferably be about $\frac{1}{100}$ of an inch clearance between wall member 34 and barrel 21. Retaining ring 24 prevents piston 32 from being thrust against wheel spindle 12 by spring 31. Barrel 21 also contains recess 36 for rubber O-ring 37.

To install hubcap 10, shouldered end 41, which is open, is placed within the open end of hub 11. A flat block of wood can be placed against the open outer end of hubcap 10, and the assembly can be tapped into hub 11 with a hammer. Shouldered end 41 is machined so as to produce a light interference fit in hub 11.

A conventional grease gun filled with waterproof chassis grease or outboard motor grease can be connected to conventional grease fitting 42 on piston 32. Spring 31 will have previously forced piston 32 within hub 11 toward the left of the drawing, until head member 33 rests against retaining ring 24. The grease is pumped into hub 11 and starts to fill it up under pressure. The pressure building up within hub 11 forces piston 32 to move toward the right of the drawing, compressing spring 31, until chamfer 35 passes O-ring 37 and piston 32 is no longer in physical contact with O-ring 37. Additional grease then escapes between O-ring 37 and piston chamfer 35, limiting the pressure within hub 11. No further increase in pressure is possible, because of this automatic pressure-relief feature, and harmful excessive pressure is thereby prevented from building up within hub 11.

When the grease escapes and appears around piston 32, piston 32 will have moved about one fourth of an inch away from wheel spindle 12, thereby compressing spring 31. The spring-loaded piston builds up a slight pressure within hub 11. Thus, the pressure within hub 11 will be maintained at slightly greater than atmospheric pressure.

When a boat trailer containing hubcaps in accordance with the present invention is towed to the launching site and backed into the water, submerging the wheel hubs, the pressure maintained within hub 11 by spring-loaded piston 32, although slight, will be sufficient to make water entry into hub 11 impossible. This will be so even if rotating seal 15 is defective.

While particular embodiments of the present invention have been shown and described, it will be obvious to those skilled in the art that changes and modifications may be made without departing from this invention in its broader aspects, and, therefore, the aim of the appended claims is to cover all such changes and modifications that fall within the spirit and scope of this invention.

I claim:

1. A boat-trailer hubcap comprising: a cylindrical barrel member open at both ends and having first, second and third recesses, said third recess being located between said first and second recesses, and one of said open ends having a shoulder and being adapted for interference-fit insertion within a wheel hub; first and second retaining rings within said first and second recesses, respectively; an O-ring within said third recess; a piston within said cylindrical barrel member, said piston having a head and a cylindrical wall member cooperating with said O-ring, there being a chamfer in the region where said head meets said cylindrical wall member, so that when said piston is in a first position, there is a seal between said O-ring and said piston, and when said piston is in a second position, there is no seal between said O-ring and said piston; a coil spring supported by said second retaining ring so as to apply force to said piston when under compression, said spring tending to move said piston into said first position, and said first retaining ring preventing said piston from being moved against any wheel spindle within said hub; and a grease fitting mounted upon the head of said piston.

2. A boat-trailer hubcap comprising: a cylindrical barrel member open at both ends and having first, second, and third recesses, said third recess being located between said first and second recesses, and one of said open ends being shouldered and adapted for insertion within a wheel hub; first and second retaining rings cooperating with said first and second recesses, respectively; an O-ring cooperating with said third recess; a piston within said cylindrical barrel member, said piston having a head and a cylindrical wall member cooperating with said O-ring, there being a chamfer in the region where said head meets said cylindrical wall member, so that when said piston is in a first position, there is a seal between said O-ring and said piston, and when said piston is in a second position, there is no seal between said O-ring and said piston; a coil spring supported by said second retaining ring so as to apply force to said piston when under compression, said spring tending to seal said cylindrical wall member of said piston against said O-ring, and said first retaining ring preventing said piston from being moved against any wheel spindle within said hub; and a grease fitting mounted upon the head of said piston.

3. A boat-trailer hubcap comprising: a cylindrical barrel member open at both ends and having first and second recesses, one of said open ends being adapted for cooperating with a wheel hub; a retaining ring cooperating with said first recess; an O-ring cooperating with said second recess; a piston within said cylindrical barrel member, said piston having a head and a cylindrical wall member cooperating with said O-ring, there being a chamfer in the region where said head meets said cylindrical wall member, so that when said piston is in a first position, there is a seal between said O-ring and said piston, and when said piston is in a second position there is no seal between said O-ring and said piston; a coil spring supported by said retaining ring so as to apply force to said piston when under compression, said spring tending to move said piston into said first position; and a grease fitting mounted upon the head of said piston.

4. Hubcap apparatus comprising: a cylindrical barrel member open at both ends and having first and second recesses, one of said open ends being adapted for cooperation with a wheel hub; a retaining ring cooperating with said first recess; an O-ring cooperating with said second recess; a piston within said cylindrical barrel member, said piston having a grease fitting thereon and a chamfered cylindrical wall member cooperating with said O-ring; and a coil spring supported by said retaining ring so as to apply force to said piston when under compression, said spring tending to seal said cylindrical wall member of said piston against said O-ring.

5. Hubcap apparatus comprising: a cylindrical barrel member open at both ends and adapted for cooperating with a wheel hub; an O-ring supported within said barrel member; a piston within said barrel member, said piston having a grease fitting thereon and a chamfered cylindrical wall member cooperating with said O-ring; and a spring applying force to said piston, said spring tending to seal said cylindrical wall member of said piston against said O-ring.

6. Hubcap apparatus comprising: a cylinder having at least one open end that is adapted for cooperating with a wheel hub; an O-ring supported within said cylinder; a piston within said cylinder, said piston having a grease fitting thereon and a chamfered wall member cooperating with said O-ring; and a spring applying force to said piston, said spring tending to seal said wall member of said piston against said O-ring.

7. A hubcap comprising: a cylinder having at least one open end adapted for cooperating with a wheel hub; an O-ring supported within said cylinder; a piston within said cylinder, said piston having a chamfered wall member co-operating with said O-ring; a grease fitting for filling said hubcap with grease under pressure; and a spring applying force to said piston, said spring tending to seal said wall member of said piston against said O-ring.

8. A hubcap comprising: a cylinder having at least one open end adapted for cooperating with a wheel hub; an O-ring supported within said cylinder; a piston within said cylinder, said piston cooperating with said O-ring; a grease fitting for filling said hubcap with grease under pressure; and a spring applying force to said piston, said spring tending to seal said piston against said O-ring.

9. A hubcap comprising: a cylinder having at least one open end adapted for cooperating with a wheel hub; sealing means within said cylinder; a piston within said cylinder, said piston cooperating with said sealing means; a grease fitting for filling said hubcap with grease under pressure; and a spring applying force to said piston in a direction such as to compress said grease within said hub, and tending to seal said piston against said sealing means.

10. A hubcap comprising: first means having at least one open end adapted for cooperating with a wheel hub; sealing means within said first means; second means within said first means, said second means cooperating with said sealing means; a grease fitting for filling said hubcap with grease under pressure; and a spring applying force to said second means in a direction such as to compress said grease within said hub, and tending to seal said second means against said sealing means.

11. Apparatus comprising: first means having at least one open end; sealing means within said first means; second means within said first means, said second means co-operating with said sealing means; a grease fitting for filling said apparatus with grease under pressure; and a spring applying force to said second means in a direction such as to compress said grease within said apparatus, and tending to seal said second means against said sealing means.

References Cited in the file of this patent

UNITED STATES PATENTS

| 1,880,854 | Davis | Oct. 4, 1932 |
| 2,254,502 | Thomas et al. | Sept. 2, 1941 |